US012013108B2

(12) United States Patent
Ansems et al.

(10) Patent No.: US 12,013,108 B2
(45) Date of Patent: Jun. 18, 2024

(54) LIGHTING DEVICE COMPRISING A LIGHT-TRANSMISSIVE ENCLOSURE

(71) Applicant: SIGNIFY HOLDING B.V., Eindhoven (NL)

(72) Inventors: Johannes Petrus Maria Ansems, Eindhoven (NL); Stephan Certain, Eindhoven (NL); Michel Cornelis Josephus Maria Vissenberg, Eindhoven (NL); Olexandr Valentynovych Vdovin, Eindhoven (NL); Joris Jan Vrehen, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/024,632

(22) PCT Filed: Sep. 16, 2021

(86) PCT No.: PCT/EP2021/075439
§ 371 (c)(1),
(2) Date: Mar. 3, 2023

(87) PCT Pub. No.: WO2022/063671
PCT Pub. Date: Mar. 31, 2022

(65) Prior Publication Data

US 2023/0324027 A1 Oct. 12, 2023

(30) Foreign Application Priority Data

Sep. 24, 2020 (EP) .................................... 20198022
Oct. 1, 2020 (EP) .................................... 20199600
Mar. 4, 2021 (EP) .................................... 21160614

(51) Int. Cl.
*F21V 3/02* (2006.01)
*F21V 3/10* (2018.01)
*F21W 131/103* (2006.01)

(52) U.S. Cl.
CPC .................. *F21V 3/02* (2013.01); *F21V 3/10* (2018.02); *F21W 2131/103* (2013.01)

(58) Field of Classification Search
CPC ..... F21V 3/02; F21V 7/06; F21V 3/10; F21V 13/04; F21V 5/04; F21V 5/046;
(Continued)

(56) References Cited

U.S. PATENT DOCUMENTS 7,422,347 B2 * 9/2008 Miyairi .................. G09F 13/22 362/333
2004/0156204 A1 8/2004 Galia
(Continued)

FOREIGN PATENT DOCUMENTS

EP 1739344 A1 1/2007
FR 3022330 A1 12/2015

*Primary Examiner* — Omar Rojas Cadima

(57) ABSTRACT

A lighting device (1) is provided. The lighting device (1) comprises a light-transmissive enclosure (10) and alight source (30). The light-transmissive enclosure (10) has an outer surface (11) and an inner surface (12) opposite to the outer surface (11). The inner surface (12) at least in part forming a cavity (20). The light-transmissive enclosure (10) has an opening (15) lying in a transverse plane (P1). The light source (30) is arranged on the transverse plane (P1), or on a side of the transverse plane (P1) opposite of the light-transmissive enclosure (10), and configured to emit light into the cavity (20). The light-transmissive enclosure (10) is arranged around a longitudinal axis (L), the longitudinal axis (L) lying in a longitudinal plane that is perpendicular to the transverse plane (P1). The light-transmissive enclosure (10) has a first part (101) and a second part (102) separated from each other by the longitudinal plane (P2).
(Continued)

The first part (101) is shaped as a first parabolic segment or a first elliptical segment having a first focal point (13) that is located on the transverse plane (P1). The second part (102) is shaped as a second parabolic segment or a second elliptical segment having a second focal point (14) that is located on the transverse plane (P1). The light source (30) is arranged between the first focal point (13) and the second focal point (14).

9 Claims, 10 Drawing Sheets

(58) Field of Classification Search
CPC . F21V 7/041; F21V 7/046; F21V 7/07; F21V 7/08; F21V 7/09; F21W 2131/103; F21Y 2115/10; F21Y 2103/10; F21Y 2105/10; G02B 19/0028; G02B 19/0061; G02B 19/0066; H01L 31/0547; F21K 9/65; F21S 4/28
See application file for complete search history.

(56) References Cited

U.S. PATENT DOCUMENTS

| | | | |
|---|---|---|---|
| 2014/0098518 | A1 | 4/2014 | Rehn |
| 2014/0268813 | A1 | 9/2014 | Maa et al. |
| 2014/0313765 | A1 | 10/2014 | Nelson et al. |
| 2015/0330605 | A1 | 11/2015 | Pijlman et al. |

* cited by examiner (a)

(b)

(c)

LIGHTING DEVICE COMPRISING A LIGHT-TRANSMISSIVE ENCLOSURE

CROSS-REFERENCE TO PRIOR APPLICATIONS

This application is the U.S. National Phase application under 35 U.S.C. § 371 of International Application No. PCT/EP2021/075439, filed on Sep. 16, 2021, which claims the benefits of European Patent Application No. 21160614.0 filed on Mar. 4, 2021; European Patent Application No. 20199600.6 filed on Oct. 1, 2020 and European Patent Application No. 20198022.4 filed on Sep. 24, 2020. These applications are hereby incorporated by reference herein.

TECHNICAL FIELD

The present invention is related to a lighting device comprising a light-transmissive enclosure, for reducing the amount of upward directed light and light pollution.

BACKGROUND

There is an interest to reduce so called light pollution from outdoor lighting devices and/or luminaires. For example, in the US no more than 1% of the light flux leaving a lighting device or luminaire may be allowed to leave at an upward angle, in relation to the horizon, or in other words, towards the sky. Further, there is an interest to provide outdoor lighting devices with an outer enclosure, in order to protect the lighting device from, for example, weather conditions like wind, rain and/or snow, or to protect vulnerable optics or electronics comprised in the lighting device.

Hence, it may be of interest to provide a lighting device comprising a light-transmissive enclosure which may reduce light pollution and/or protect the lighting device.

SUMMARY

In view of the above discussion, a concern of the present invention is to provide a light-transmissive enclosure which can reduce the upward light pollution of a lighting device. It is further a concern of the present invention to provide a light-transmissive enclosure which can protect the lighting device and electronic and/or optical components of the lighting device.

To address at least one of these concerns and other concerns, a lighting device in accordance with the independent claim is provided. Preferred embodiments are defined by the dependent claims.

According to a first aspect of the present invention, a lighting device is provided. The lighting device comprises a light-transmissive enclosure and a light source. The light-transmissive enclosure has an outer surface and an inner surface opposite to the outer surface, the inner surface at least in part forming a cavity. The light-transmissive enclosure has an opening lying in a transverse plane. The light source is arranged on the transverse plane, or on a side of the transverse plane opposite of the light-transmissive enclosure, and configured to emit light into the cavity. The light-transmissive enclosure is arranged around a longitudinal axis, the longitudinal axis lying in a longitudinal plane that is perpendicular to the transverse plane. The light-transmissive enclosure has a first part and a second part separated from each other by the longitudinal plane. The first part is shaped as a first parabolic segment having a first focal point that is located on the transverse plane and between the second part and the longitudinal plane. The second part is shaped as a second parabolic segment having a second focal point that is located on the transverse plane and between the first part and the longitudinal plane. And the light source is arranged between the first focal point and the second focal point.

In order to conform with the severe requirements regarding light pollution, preferably most of the light leaving the lighting-transmissive enclosure to have a direction not intersecting the transverse plane. For example, at least 99% of the light is collimated light parallel or directed downward from the transverse plane. The light-transmissive enclosure may comprise a light-translusive or light-transmissive material. The light-translusive or light-transmissive material may, for example, comprise plastic, glass, quartz, a carbon-based material, and/or a combination thereof.

The light-transmissive enclosure may have a shape of a parabolic segment rotated around the longitudinal axis. A parabola may be understood as a plane curve which is mirror-symmetrical, and may be viewed as comprising a U-shape. A parabolic segment rotated around the longitudinal axis may be understood as a mirror-symmetrical segment of a segment of the plane curve rotated 180° (i.e. $\pi$ rad) around the longitudinal axis (i.e. the axis of symmetry). Further, a parabolic segment rotated around the longitudinal axis may be understood as a mirror-symmetrical segment of the plane curve rotated 360° (i.e. $2\pi$ rad) around the longitudinal axis (i.e. the axis of symmetry). A parabolic segment may for example be understood as any section between a maximum and a minimum of the parabola. Further, a minimum of a parabola may, for example, be understood as a bottom of a parabola, and a maximum of a parabola may, for example, be understood as an end or ends of a parabola. The maximum of the parabola may be facing towards the transverse plane and the minimum of the parabola may be facing towards the cavity of the light-transmissive enclosure. For example, a parabolic segment may be understood as the section of the parabola from a point above the minimum to a maximum. Further, a parabolic segment may be understood as a section of a parabola moved closer to, or further from, the longitudinal axis. For example, the parabolic segment may be a section of a parabola starting at a first point, on the parabola, above the minimum of the parabola and ending at a second point towards the maximum of the parabola. The first point being closer to the longitudinal plane or axis compared to the second point. The parabolic segment may be moved towards the longitudinal axis. For example, the parabolic segment may be moved such that the first point is on the longitudinal plane and the second point being on the transverse plane.

The first part and the second part of the light-transmissive enclosure facing the transverse plane may define the opening. Alternatively, the first part and the second part of the light-transmissive enclosure facing the transverse plane may define a partial opening that is part of a lighting device opening.

The light source may be, for example, an extended linear light source, such as, for example, a linear array of LEDs, or a light emitting tube.

The light source may be arranged substantially at the opening. Further, the at least one light source may be arranged at a distance from the opening, wherein the distance may, for example, be less than one inch. The light source may therefore be arranged above or below the opening, at or less than said distance. The one light source may also be arranged above the focal point, at or less than said distance.

The light-transmissive closure may comprise a lower opening lying in a lower plane that is parallel to the said transverse plane. The lower opening may be configured for attaching the light enclosure to a luminaire or lamp post.

It is to be understood that light emitted by the light source that is impinging on one of the outer surface and the inner surface results in Fresnel reflections. Hence, Fresnel reflection from the cavity and subsequently transmitted through and out of the light-transmissive enclosure via the outer surface may have a direction that is not intersecting the transverse plane so that the severe 1% upward light restriction can be realized. Further, at least first-order Fresnel reflections of light emitted by the light source into the cavity by at least one of the outer surface and the inner surface and subsequently transmitted through and out of the light-transmissive enclosure via the outer surface may have a direction not intersecting the plane.

The longitudinal axis may be understood as, for example, an axis of rotation and/or an axis of symmetry. The longitudinal axis or the longitudinal plane may be located between a cross-section of the light-transmissive enclosure having a first part and a second part, each having a parabolic segment shape and a focal point of that parabolic segment. The focal point may be at a distance from the longitudinal plane along a transverse perpendicular to the longitudinal plane. The focal point may be understood as a focal point of part of a cross-section along a longitudinal axis of the enclosure. Further, the enclosure may comprise a focal point for each of such cross-sections around a longitudinal axis of the enclosure. It is to be understood that a focal point may have a corresponding mirrored focal point with regards to a longitudinal axis of the enclosure. The focal points of every cross-section along the longitudinal axis may be understood as an ensemble of focal points. The focal points of every cross-section of a symmetric light-transmissive enclosure along the longitudinal axis may be understood to form a circle of focal points on the transverse plane around the longitudinal axis.

The first part and the second part of the light-transmissive enclosure may be symmetrically arranged around the longitudinal axis. Therefore, the second part may be a mirror image of the first part or vice versa. Hence, the first focal point and second focal point can be at equal distances from the longitudinal plane.

The first part and the second part of the light-transmissive enclosure may be asymmetrically arranged around the longitudinal axis. Therefore, the shape of the first parabolic segment is different from the second parabolic segment. Hence, the first focal point and second focal point are at different distances from the longitudinal plane.

The focal point may be on the transverse plane. The light-transmissive enclosure may have a virtual surface, defined between the outer surface and the inner surface. In other words, the virtual surface may be defined inside the enclosure. Additionally, the light-transmissive enclosure may have a virtual interior center surface, defined along the middle between the outer surface and the inner surface. Hence, if the outer surface and the inner surface have the same parabolic segment shape, the virtual surface and the virtual interior center surface would be the same surface.

The light source may be arranged between the focal points, the first focal point and the second focal point. Therefore, the length of the light source is limited by the distance of the focal points. At least one of the light emitters from the light source may coincide with the focal points but the light source may be arranged so that all of the light emitters from the light source are limited within the focal points. The at least one light emitter from the light source may not be arranged so that the position of at least one light source exceeds beyond the focal points to conform with the severe requirements regarding light pollution.

The light source may be arranged such that it is between the focal points. The light source may be arranged such that it is located in between every focal point of every cross-section around a longitudinal axis of the enclosure. The light source may be arranged such that all the light emitted by the light source into the cavity is coming from the transverse plane.

According to a second aspect of the present invention, a lighting device is provided. The lighting device comprises a light-transmissive enclosure and a light source. The light-transmissive enclosure has an outer surface and an inner surface opposite to the outer surface, the inner surface at least in part forming a cavity. The light-transmissive enclosure has an opening lying in a transverse plane. The light source is arranged on the transverse plane, or on a side of the transverse plane opposite of the light-transmissive enclosure, and configured to emit light into the cavity. The light-transmissive enclosure is arranged around a longitudinal axis, the longitudinal axis lying in a longitudinal plane that is perpendicular to the transverse plane. The light-transmissive enclosure has a first part and a second part separated from each other by the longitudinal plane. The first part and the second part have shapes in the form of a first elliptical segment and a second elliptical segment, respectively. The first elliptical segment has a first focal point and a second focal point. The first focal point is located between the first elliptical segment and the longitudinal plane and the second focal point being located between the second elliptical segment and the longitudinal plane. The second elliptical segment has a third focal point and a fourth focal point, the third focal point is located between the second elliptical segment and the longitudinal plane, and the fourth focal point being located between the first elliptical segment and the longitudinal plane. Each of the first focal point, the second focal point, the third focal point, and the fourth focal point is located on the transverse plane and within the opening. The light source is arranged between the first focal point and the third focal point.

An elliptical segment may be understood to be a section of a plane curve known as an ellipse having two focal points located on an axis called the major axis. The light-transmissive enclosure may have an elliptical segment shape that is symmetrically configured around the longitudinal axis and the foci of the ellipse are located at the transverse axis within the opening of the light-transmissive enclosure. Therefore, the major axis of the elliptical segment may coincide with the transverse axis, and the first part and the second part of the light-transmissive enclosure are the part of the same ellipse. As a result, the minimum of the ellipse located on the longitudinal plane and two maxima are located on the transverse plane. As a result, the first focal point and the fourth focal point may be located in substantially the same position and the same may hold true for the second focal point and the third focal point. All focal points may be located within the opening defined by the light-transmissive enclosure.

If the first part and the second part of light-transmissive enclosure are parts of two different elliptical segments, then the first focal point and the fourth focal point may not be located in the same position and the same may hold true for the second focal point and the third focal point.

The length of the light source may be defined by the distance between the first focal point and the third focal point. Hence, at least one light emitter from the light source may coincide with these focal points, but may not exceed beyond these focal points.

At least one of the outer surface and the inner surface of the light-transmissive enclosure may be shaped in a parabolic segment. Both the outer surface and the inner surface of the light-transmissive enclosure may be shaped in parabolic segments such that focal points of the parabolic segments are at the transverse plane.

For practical purpose, the light-transmissive enclosure may be thin and has constant thickness. Then the focal points for the inner surface and the outer surface having a parabolic segment shape can be very close to each other. In certain condition, they can be indistinguishable. It is to be understood that from the focal point closest to the longitudinal plane is taken in consideration for determining the position or length of the light source.

At least one of the outer surface and/or the inner surface may have shapes in the form of an elliptical segment.

The light-transmissive enclosure may have a constant thickness.

It is to be understood that the light-transmissive enclosure having a constant thickness between the parabolic segment or elliptical segment shapes of the outer surface and the inner surface, it is not necessarily meant that the thickness of the light-transmissive enclosure is exactly the same (but it may be). Some variation of the thickness of the light-transmissive enclosure between the parabolic segment or elliptical shapes may be allowed. Thus, the thickness may be substantially constant. For example, the thickness difference between the thickest portion and the thinnest portion of the light-transmissive enclosure is less than 5%. However, a difference between the thickest portion and the thinnest portion of the light-transmissive enclosure may be less than 20%. Further, a difference between the thickest portion and the thinnest portion of the light-transmissive enclosure may preferably be less than 10%. A light-transmissive enclosure having a constant thickness along the parabolic segment or elliptical segment shape may be understood as the shape of the outer surface and the shape of the inner surface being the same, substantially the same, or similar. The enclosure may have a variable thickness.

The first part and/or the second part of the light-transmissive enclosure may comprise a first segment and a second segment, at least one having a parabolic segment or elliptical segment shape such that the focal points of the first segment and the second segment are on the transverse plane. As long as, the light source is located between the focal points, light emitted by the light source into the cavity coming from the transverse plane and which is reflected by at least one of the outer surface and the inner surface of at least one of the first segment and the second segment and subsequently transmitted through and out of the light-transmissive enclosure via the outer surface may have a direction not intersecting the transverse plane. The first segment and the second segment may be monolithic. The first segment and the second segment may be comprised of the same material or materials. However, the first segment and the second may be comprised of different materials. The second segment may have a different focal point than the first segment. The first segment may be located between the transverse plane and the second segment. The second segment may have a non-parabolic shape, for example, a cylindrical shape or a circular shape.

The light-transmissive enclosure may further comprise an anti-reflection coating arranged on the inner surface.

The lighting device may comprise a housing that is light absorptive or a light reflective and located on the transverse plane, or on a side of the transverse plane opposite of the light-transmissive enclosure. And the housing is configured to cover the opening. The housing may have the necessary arrangement to hold the light source.

Because any light originating from a focal point of an ellipse or an elliptical segment and reflected by the ellipse or the elliptical segment towards the other focal point. As long as the focal points are within the opening and the opening is closed by a light absorptive or light reflective housing, light reflected by at least one of the outer surface and the inner surface would not contribute to the light output from the lighting device that would eventually intersect the transverse plane. Therefore, such a configuration of the light-transmissive enclosure may also conform with the severe requirements regarding light pollution.

The outer surface of the light-transmissive enclosure may have a shape in the form of a parabolic segment and the inner surface of the light-transmissive enclosure may have a shape in the form of an elliptical segment. Therefore, the thickness of the light-transmissive enclosure may increase in the direction of the cavity.

According a third aspect of the present invention, a lighting device is provided. The lighting device comprises a light-transmissive enclosure and a light source. The light-transmissive enclosure has an outer surface and an inner surface opposite to the outer surface, the inner surface at least in part forming a cavity. The light source is arranged on a transverse plane, or on a side of the transverse plane opposite of the light-transmissive enclosure, and configured to emit light into the cavity. The light-transmissive enclosure is arranged around a longitudinal axis, the longitudinal axis lying in a longitudinal plane that is perpendicular to the transverse plane. The light-transmissive enclosure has a first part and a second part separated from each other by the longitudinal plane. At least one of the first part and the second part has a first segment and a second segment. The first segment being located in between the transverse plane and the second segment. And the second segment being connected with the first segment at a point located on a lower plane that is parallel to the transverse plane. The light-transmissive enclosure has a first segment opening lying in a transverse plane. The first segment opening being defined by the first part and the second part of the first segment. The first part and the second part of the first segment have shapes in the form of a first elliptical segment and a second elliptical segment, respectively. The first elliptical segment has a first ellipse focal point and a second ellipse focal point, the first ellipse focal point being located between the first elliptical segment and the longitudinal plane and the second ellipse focal point being located between the second elliptical segment and the longitudinal plane. The second elliptical segment has a third ellipse focal point and a fourth ellipse focal point, the third focal point being located between the second elliptical segment and the longitudinal plane, and the fourth ellipse focal point being located between the first elliptical segment and the longitudinal plane. Each of the first ellipse focal point, the second ellipse focal point, the third ellipse focal point, and the fourth ellipse focal point is located on the transverse plane and within the opening. The light source is arranged between the first ellipse focal point and the third ellipse focal point. The light-transmissive enclosure has a second segment opening lying in a lower plane, the second segment opening being defined by the first part and the second part of the second segment. The first part of the second segment is shaped as a first parabolic segment having a first parabola focal point that is located on the lower plane. The second part of the second segment is shaped as a second parabolic segment having a second parabola focal point that is located on the lower plane, and the light source is arranged between the first parabola focal point (13') and the second parabola focal point.

According to a fourth aspect of the present invention, a lighting device is provided. The lighting device comprises a light-transmissive enclosure and a light source. The light-transmissive enclosure has an outer surface and an inner surface opposite to the outer surface, the inner surface at least in part forming a cavity. The light-transmissive enclosure has an opening lying in a transverse plane. The light source is arranged on the transverse plane, or on a side of the transverse plane opposite of the light-transmissive enclosure, and configured to emit light into the cavity. The light-transmissive enclosure is arranged around a longitudinal axis, the longitudinal axis lying in a longitudinal plane that is perpendicular to the transverse plane. The light-transmissive enclosure has a first part and a second part separated from each other by the longitudinal plane. The first part and the second part have shapes in the form of a first parabolic segment and a second elliptical segment, respectively. The first parabolic segment has a first focal point located between the second elliptical segment and the longitudinal plane. The second elliptical segment has a third focal point and a fourth focal point, the third focal point is located between the second elliptical segment and the longitudinal plane, and the fourth focal point being located between the first parabolic segment and the longitudinal plane. Each of the first focal point, the third focal point, and the fourth focal point is located on the transverse plane and within the opening. The light source is arranged between the first focal point and the third focal point.

It is noted that the invention relates to all possible combinations of features recited in the claims. Other objectives, features, and advantages of the present inventive concept will appear from the following detailed disclosure, from the attached claims as well as from the drawings. A feature described in relation to one of the aspects may also be incorporated in the other aspect, and the advantage of the feature is applicable to all aspects in which it is incorporated.

BRIEF DESCRIPTION OF THE DRAWINGS

Exemplifying embodiments of the invention will be described below with reference to the accompanying drawings.

Figure 1:
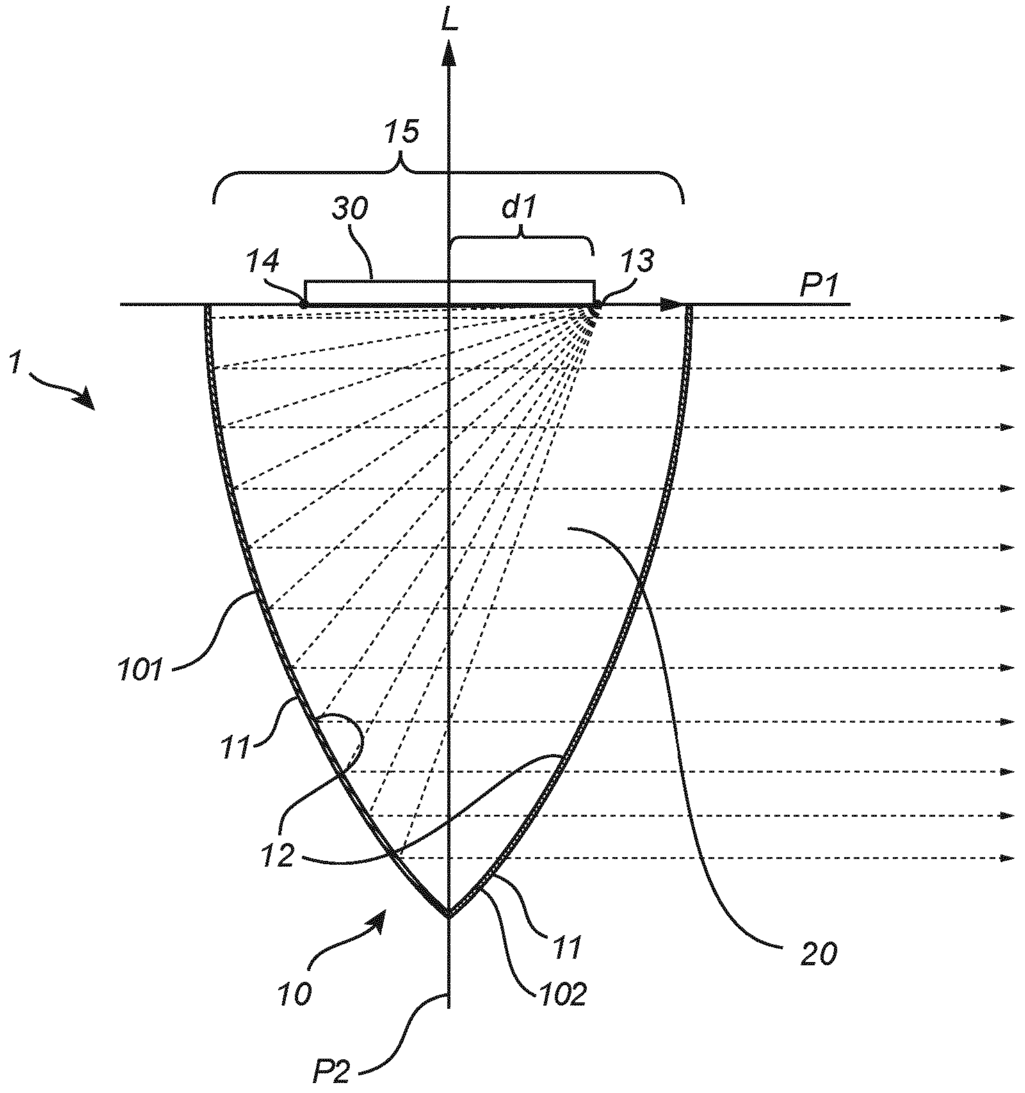
FIG. 1 is a schematic view of a cross section of a lighting device.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments of the present invention are provided by way of example so that this disclosure will convey the scope of the invention to those skilled in the art. In the drawings, identical reference numerals denote the same or similar components having a same or similar function, unless specifically stated otherwise.

FIG. 1 is a schematic view of a cross-section of a lighting device 1. In FIG. 1, the cross-section of the lighting device 1 is parallel to a longitudinal axis L of the lighting device 1. FIG. 1 shows a lighting device 1 comprising a light-transmissive enclosure 10. The light-transmissive enclosure 10 is shown as having an outer surface 11 and an inner surface 12 opposite to the outer surface 11. The inner surface 12 is shown to at least in part form a cavity 20. The light-transmissive enclosure 10 has an opening 15 lying in a transverse plane P1. The shown lighting device 1 further comprises a light source 30 on the transverse plane P1, and configured to emit light into the cavity 20. The light source 30 may for example be an extended light source and may be referred to as such in the following without loss of generality. The shown cross-section of the light-transmissive enclosure 10 comprising a first part 101 and a second part 102 and each of the first part 101 and the second part 102 has a parabolic segment shape. The first parabolic segment corresponding to the first part 101 has a first focal point 13 and the second parabolic segment corresponding to the second part 102 has a second focal point 14 that are on the transverse plane P1. The light emitted by the shown light source 30 into the cavity 20 coming from the first focal point 13 and which is reflected by at least one of the outer surface 11 and the inner surface 12 and subsequently transmitted through and out of the enclosure 10 via the outer surface 11 has a direction not intersecting the transverse plane P1. It may be understood that every cross-section plane that is parallel to the longitudinal axis L will comprise a cross-section of the light-transmissive enclosure 10 having the parabolic segment shape. FIG. 1 shows the extended light source 30 being arranged at the opening 15 and centered with regards to the longitudinal axis L. The shown light source 30 is arranged such that an end of the light source 30 is arranged at the focal point 13. FIG. 1 shows light emitted by the light source 30 from the focal point 13. The light emitted by the light source 30 from the focal point 13 is reflected by at least one of the outer surface 11 and the inner surface 12 and subsequently transmitted through and out of the enclosure 10 via the outer surface 11 having a direction not intersecting the transverse plane P1. Further, the light emitted by the light source 30 from the focal point 13 is reflected by at least one of the outer surface 11 and the inner surface 12 and subsequently transmitted through and out of the enclosure 10 via the outer surface 11 is substantially collimated light. The substantially collimated light may have a direction substantially parallel to the transverse plane P1. The shown focal point 13 is at a distance d1 from the longitudinal axis L that is lying in a longitudinal plane P2. The longitudinal plane P2 is perpendicular to the transverse plane P1. The shown distance is a horizontal distance. In other words, the parabolic segment shape and the distance between the longitudinal axis and the focal point 13 may be adjusted, with regards to each other, such that light emitted by the light source 30 from the focal point 13 is reflected by at least one of the outer surface 11 the inner surface 12 and subsequently transmitted through and out of the enclosure 10 via the outer surface 11 is substantially collimated light. Furthermore, it may be understood that there is a corresponding mirrored focal point, the second focal point 14 on the other side of the longitudinal axis L. The light source 30 is arranged such that the other end of light source 30 is arranged at the mirrored focal point. Hence, the mirrored focal point is defined in a manner similar to the definition of the focal point 13. It is to be understood that the light source 30 may emit light from the entirety, or substantially the entirety, of a surface of the light source 30 facing into the cavity 20. Also, the length of the light source 30 may be smaller than the distance between the first focal point 13 and the second focal point 14. The parabolic segment shape shown in FIG. 1 is an exemplary shape, and it is to be understood that the present inventive concept is not limited to the parabolic shape shown in FIG. 1. Further, the curved shape in FIG. 1 may be understood as a section of a parabola, wherein an end of the section of a parabola is arranged at the longitudinal axis L, and a mirrored corresponding section of a parabola. It is to be understood that the section of a parabola and the mirrored section of a parabola shown in the cross-section in FIG. 1 may be comprised by the light-transmissive enclosure 10, wherein the light-transmissive enclosure 10 has a shape of the section of parabola rotated around the longitudinal axis L.

The light-transmissive enclosure 10 in FIG. 1 is presented to be thin and has a constant thickness. Therefore, the focal points for the inner surface 12 and the outer surface 11 having parabolic segment shapes can be very close to each other. In certain condition, they can be indistinguishable in naked eye. The first focal point 13 or the second focal point 14 can therefore be taken as overlapping focal points for the inner surface and the outer surface having parabolic segment shapes. If the focal points for the inner surface and the outer surface having parabolic segment shapes are substantially different from each other, it is to be understood that from the focal point closest to the longitudinal plane P2 should taken in consideration for determining the position or length of the light source 30.

Figure 2:
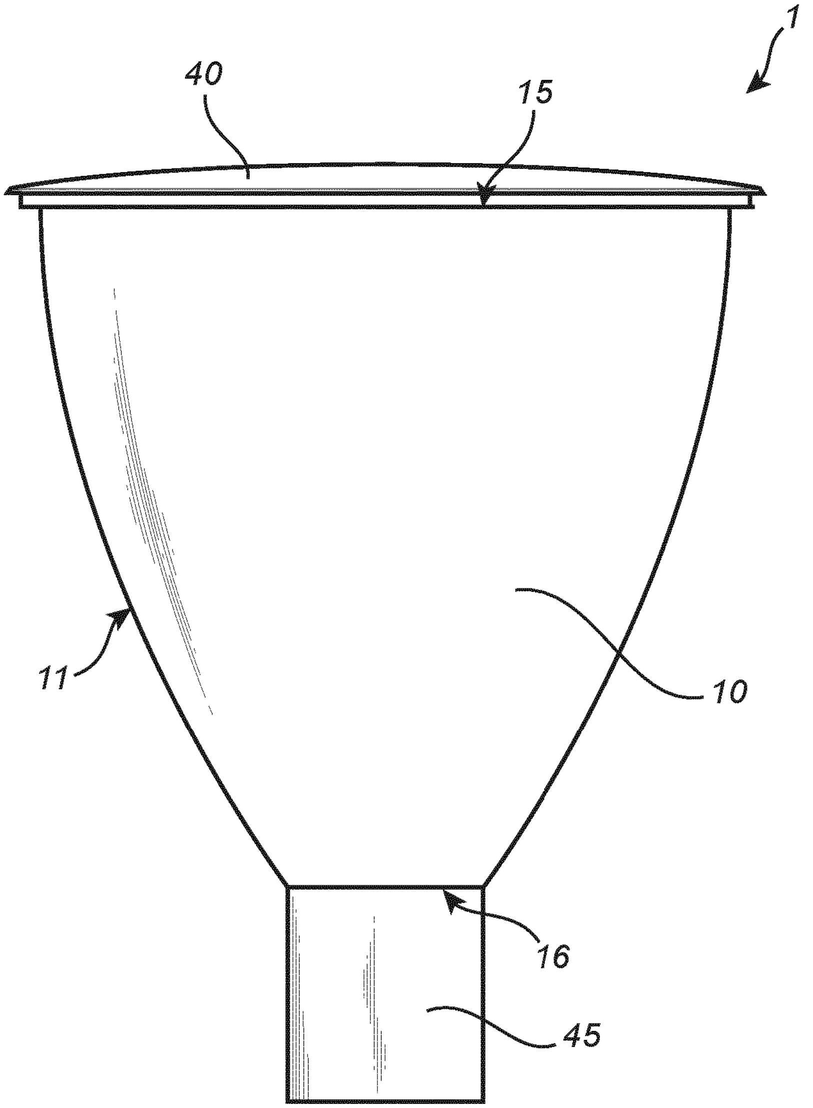
FIGS. 2-3 are schematic views of lighting devices.

FIG. 2 is a schematic view of a lighting device according to one or more exemplifying embodiments of the present invention. It should be noted that FIG. 2 comprises features, elements and/or functions as shown in FIG. 1 and described in the associated text. Hence, it is also referred to that figure and the description relating thereto for an increased understanding. The same reference numerals in FIGS. 1 and 2 denote the same or similar components, having the same or similar function. FIG. 2 shows a lighting device 1 comprising a light-transmissive enclosure 10, a light source housing 40 and a light source mount 45. The light-transmissive enclosure 10 is arranged between the housing 40 and the mount 45. The housing 40 may be understood to comprise at least one light source 30 (not shown; see e.g. FIG. 1) arranged in or at the opening 15 (not shown; see e.g. FIG. 1). Further, the light source 30 may be electrically coupled, through the light-transmissive enclosure 10, to a power source via the mount 45. The mount 45 may be understood as a lamp post. Additionally, the light source 30 may be electrically coupled to a power source housed in the housing 40 or the mount 45. The enclosure 10 in FIG. 2 has a shape in the form of a parabolic segment rotated around a longitudinal axis. The housing 40 is arranged over the opening 15. Further, the light-transmissive enclosure 10 comprises a lower opening. The lower opening is arranged at the mount 45. The arrangement of the housing 40, the light-transmissive enclosure 10 and the mount 45 may be hermetically coupled, or substantially hermetically coupled, such that dust, vapor and/or fluids are unable to enter into the arrangement.

Figure 3:
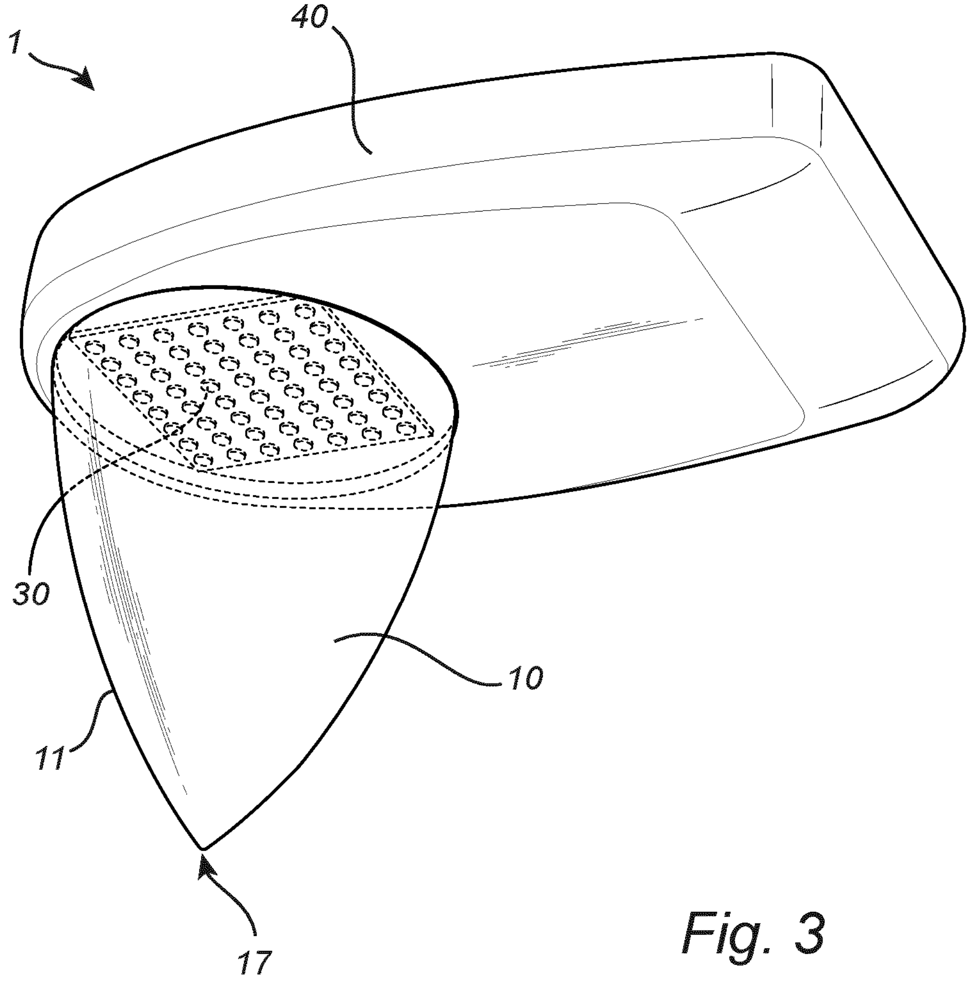

FIG. 3 is a schematic view of a lighting device according to one or more exemplifying embodiments of the present invention. It should be noted that FIG. 3 comprises features, elements and/or functions as shown in FIGS. 1-2 and described in the associated texts. Hence, it is also referred to those figures and descriptions relating thereto for an increased understanding. The same reference numerals in FIGS. 1-2 and 3 denote the same or similar components, having the same or similar function. FIG. 3 shows a lighting device 1 comprising a light-transmissive enclosure 10 and a light source 30. The light source 30 is comprised of a plurality of light sources. The plurality of light sources are arranged in a grid. However, it is to be understood that the plurality of light sources are not limited to being arranged in a grid. For example, the light sources may be arranged in any shape, such as in a circular arrangement. The light source 30 is arranged at the opening 15 of the light-transmissive enclosure 10. The housing 40 is configured to be mounted on a lamp post. The light source 30 may be electrically coupled to the housing 40. Further, the light source 30 may be coupled to a power source, such as an electric grid, via the housing 40 and a lamp post to which the housing 40 is coupled. An end 17 of the light-transmissive enclosure 10 opposite the opening 15 is arranged along the longitudinal axis, which may be understood as the axis of symmetry, of the light-transmissive enclosure 10.

FIG. **4*a* is a schematic view of a cross-section of a light-transmissive enclosure 10. It should be noted that FIG. 4*a* comprises features, elements and/or functions as shown in FIGS. 1-3 and described in the associated texts. Hence, it is also referred to those figures and descriptions relating thereto for an increased understanding. The same reference numerals in FIGS. 1-3 and 4*a*** denote the same or similar components, having the same or similar function.

Figure 4A:
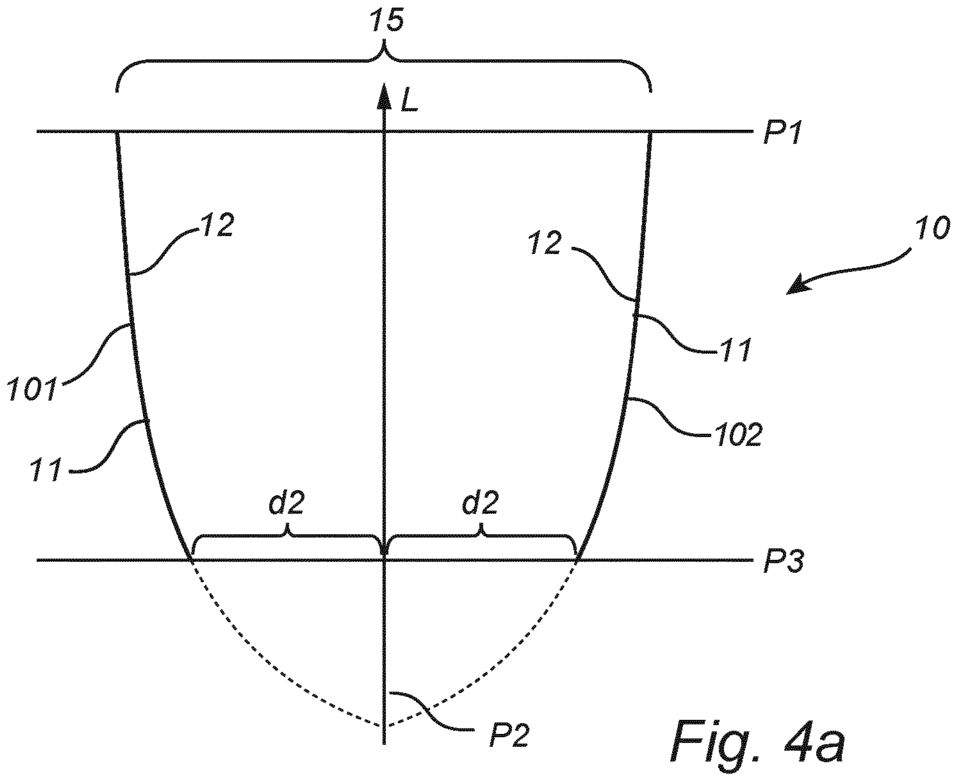
FIGS. 4*a*-4*b* are schematic views of cross-sections of light-transmitting enclosures parallel to longitudinal axes of the light-transmitting enclosures.
Figure 4B:
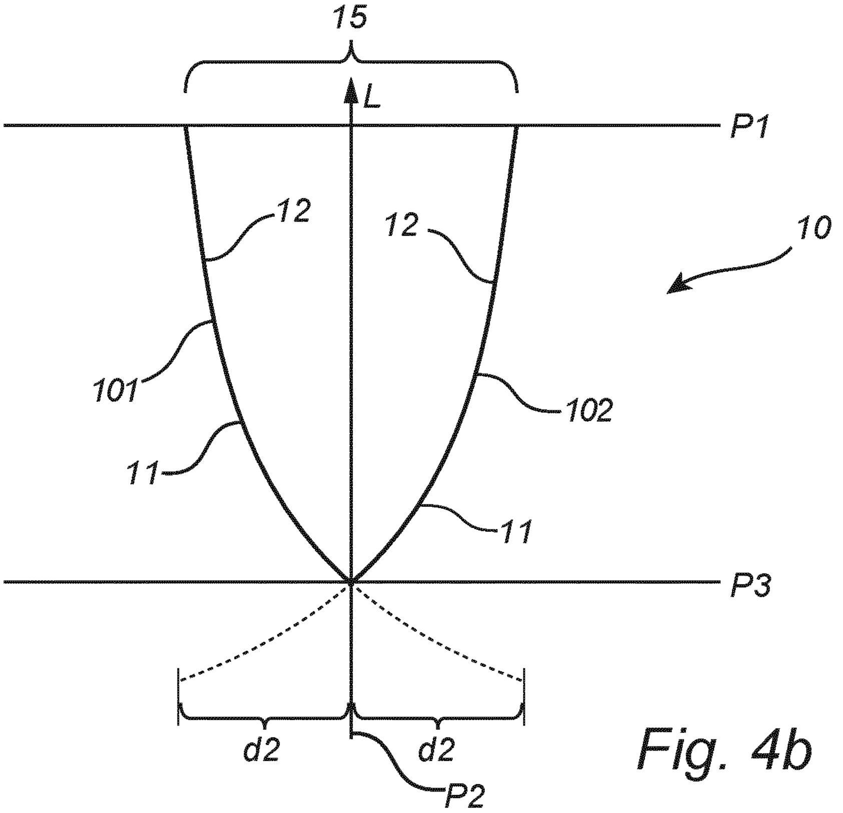

In FIG. **4*a*, the cross-section of the light-transmissive enclosure 10 is parallel to a longitudinal axis L of the light-transmissive enclosure 10. The cross-section of the light-transmissive enclosure 10 shown in FIG. 4*a* comprises two parabolic segments, the first parabolic segment corresponding to the first part 101 and the second parabolic segment 102 corresponding to the second part 102. Each of the first part 101 and the second part 102 comprises an outer surface 11, and an inner surface 12. It is to be understood that the light-transmissive enclosure 10 shown in FIG. 4*a* comprises a parabolic segment shape, wherein every cross-section along the longitudinal axis L shows two parabolic segment shapes corresponding to the first part 101 and the second part 102 as shown in FIG. 4*a*. In other words, the parabolic segment shapes are rotated around the longitudinal axis L. Hence, the outer surfaces 11, and the inner surfaces 12, of the parabolic segment shapes are part of the outer, and inner, the surface of the shape, respectively. The parabolic segment shapes are mirrored with regards to the longitudinal axis L. The enclosure has an opening 15 lying in a transverse plane P1. The transverse plane P1 is perpendicular to the longitudinal plane P2. Each parabolic segment shape comprises a lower end and an upper end. The upper ends of the parabolic segment shapes are at a greater horizontal distance from the longitudinal axis L than the lower ends. The lower ends are at a distance d2 from the longitudinal axis L. The lower ends are in a lower plane P3. The lower plane P3 is parallel with the transverse plane P1. The light-transmissive enclosure 10 comprises a lower opening lying in the lower plane P3. The parabolic segment shapes may be understood as sections of a parabola. Further, FIG. 4***a* shows dashed lines projecting from the lower ends of parabolic shapes. The dashed lines follow a parabolic curve of the parabolic shapes. The dashed lines end at the longitudinal axis L. The parabolic shapes and the dashed together have a shape substantially identical to the parabolic segment shape shown in FIG. 1. In other words, the light-transmissive enclosure 10 may be understood as a parabolic segment shape rotated around the longitudinal axis L and having the longitudinal L as its axis of symmetry which is bound between the transverse plane P1 and the lower plane P2. Further, every cross-section along the longitudinal axis L of the shape may show the cross-section as shown in FIG. 4*b*. The light-transmissive enclosure 10 may be understood as monolithic, wherein the light-transmissive enclosure 10 is formed by the two mirrored parabolic segment shapes.

FIG. 4*b* is a schematic view of a cross-section of a light-transmissive enclosure 10. The same reference numerals in FIGS. 4*a* and 4*b* denote the same or similar components, having the same or similar function. A difference between the light-transmissive enclosure 10 as shown in FIG. 4*b* and the light-transmissive enclosure as shown in FIG. 4*a* is that the parabolic segment shapes have been moved horizontally towards the longitudinal axis L. The parabolic segment shapes have been moved the distance d2 towards the longitudinal axis L, such that the lower ends of the parabolic segment shapes are at the longitudinal axis L. The cross-sections of the light-transmissive enclosure 10 shown in FIG. 4*b* comprises a parabolic segment shape, wherein every cross-section along the longitudinal axis L shows two parabolic segment shapes belonging to the first part 101 and the second 102 of the light-transmissive enclosure 10 as shown in FIG. 4*b*. In other words, the parabolic segment shapes are rotated around the longitudinal axis L to form the enclosure 10. Hence, the outer surfaces 11, and the inner surfaces 12, of the parabolic shapes are part of the outer, and inner, surface of the enclosure, 10 respectively.

However, it is to be noted that is purely exemplary and the present inventive concept is not limited to moving the parabolic segment shapes a specific distance. For example, the longitudinal shapes could be moved any distance lesser than d2 towards the longitudinal axis L, or substantially any distance away from the longitudinal axis L. The lower ends of the parabolic segment shapes shown in FIG. 4*b* are adjoined, such that the light-transmissive enclosure 10 does not comprise a lower opening.

Figure 5:
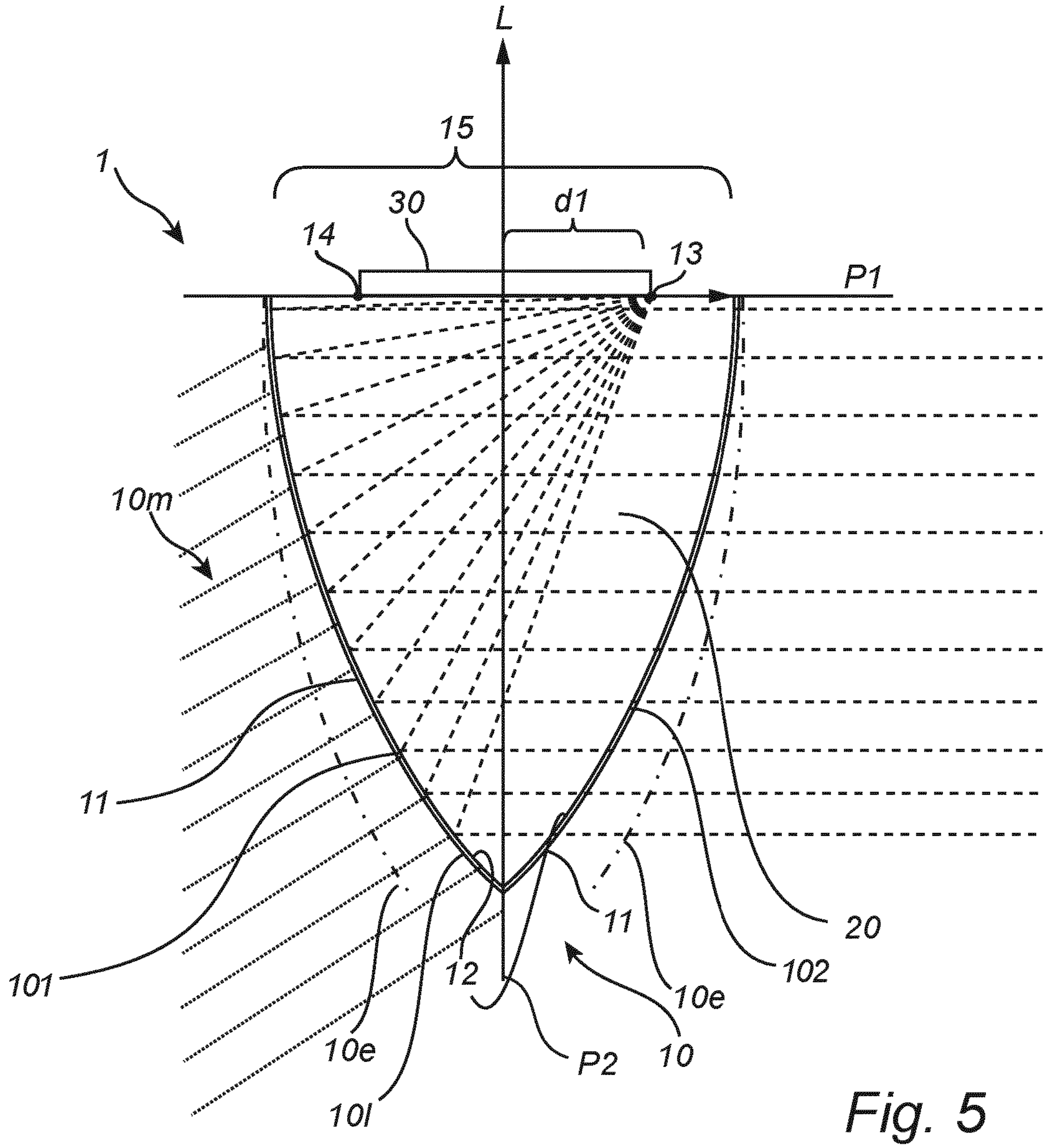
FIG. 5 shows a design method for realizing a lighting device that conforms with the severe upward light restriction for reducing light pollution.
Figure 6:
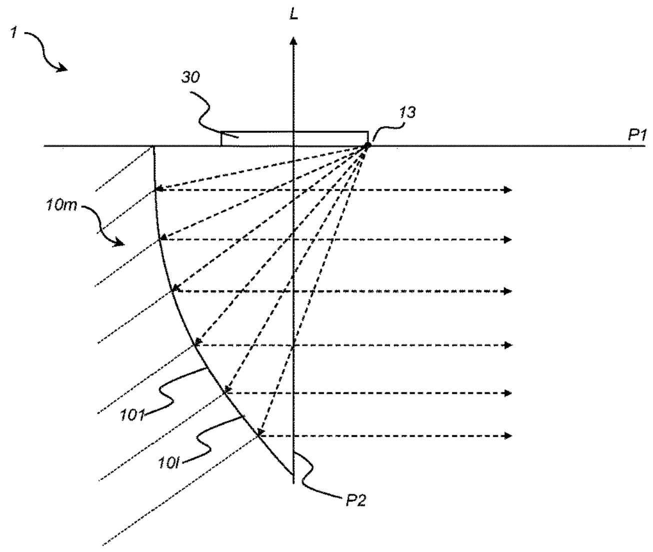
FIG. 6(*a*) to (*c*) show schematic cross-sectional views of a lighting device with a light-transmissive enclosure at a parabolic limit curve.
Figure 6:
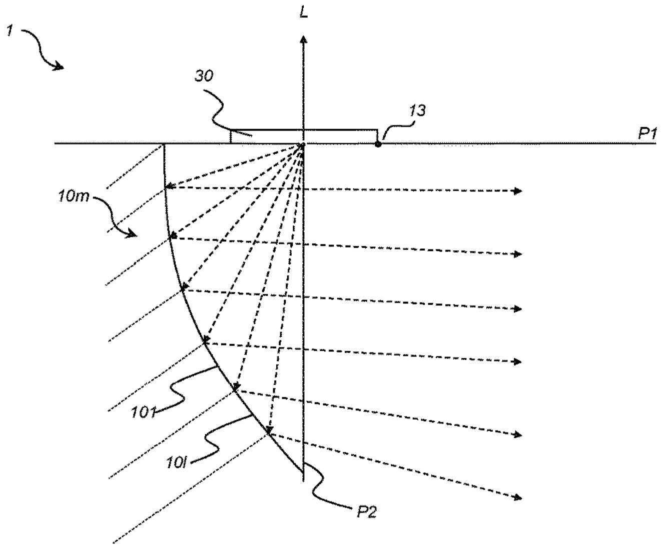
Figure 6:
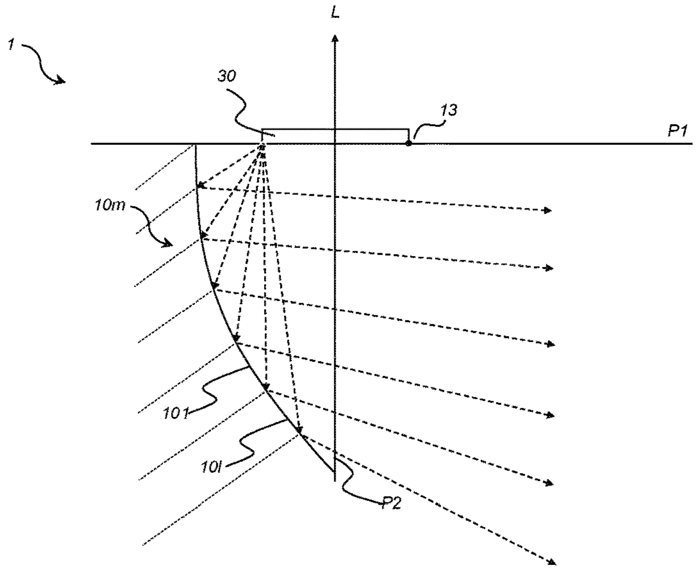

FIG. 5 shows a schematic cross-sectional view of a lighting device 1. With this figure, a flexible method for realizing different designs of the light-transmissive enclosure 10 is described that conforms with the severe requirements regarding light pollution. The lighting device 1 comprises a light-transmissive enclosure 10 having a parabolic segment shape that is mirror-symmetric with respect to a longitudinal axis L. The light-transmissive enclosure 10 has an outer surface 11 and an inner surface 12 having parabolic shapes. The light-transmissive enclosure 10 may be considered to be rotationally symmetric around the longitudinal axis L. The parabolic segment shape of the light-transmissive enclosure 10 has an opening 15 lying in a transverse plane P1. Opposite to the opening 10, the light-transmissive enclosure 10 is enclosed by the two parabolic segment shapes of the light-transmissive enclosure 10 meeting at the longitudinal axis L. A light source 30 is symmetrically arranged with respect to the longitudinal axis L and at the opening 15 of the lighting device 1 configured to emit light in the cavity formed by the light-transmissive enclosure 10. The light source 30 is arranged between the first focal point 13 and the second focal point 14. The first focal point 13 belongs to the first parabolic segment (the first part 101) on the left of the longitudinal plane P2 and the second focal point 14 belongs to the second parabolic segment (the second part 102) on the right of the longitudinal plane P2. At least one emitter from the light source 30 can be on the focal point 13. Light originating from this point and impinging on to the outer surface 11 and inner surface 12 of the light-transmissive enclosure 10 will be reflected in a direction parallel to the transverse plane P1. This arrangement is also shown in FIG. 6(*a*). Light originating from any other points between the focal point 13 and the first part 101 of the light-transmissive enclosure 10 would result in reflected light that does not intersect with the plane P1 (as shown in FIGS. 6(*b*) and 6(*c*)). The light source 30 may be arranged so that at least one light source 30 is not exceeding beyond the focal point 13, but positioned between the focal point 13 and the parabolic segment shaped light-transmissive enclosure 10. As a result, the light may not transmit in an upward direction from the lighting device 1 and potentially allowing 99% light reflected from the light-transmissive enclosure 10 in a direction not intersecting the transverse plane P1.

The light-transmissive enclosure 10 that has a parabolic segment shape with a focal point 13 may serve as a parabolic limit curve for realizing other compliant shapes for the light-transmissive enclosures. The hatched area shown in FIGS. 5 and 6 can be considered as a parabolic compliance area 10*m*. Within the parabolic compliance area 10*m*, any parabolic segment that has a higher slope compared to the parabolic limit curve 10*l* (as shown in FIGS. 5 and 6) may result in a compliant enclosure for the outdoor lighting device for reducing light pollution. In other words, a parabolic segment being located within parabolic compliance area 10*m* such that a corresponding focal point may be located on the transverse plane P1, but not being located between the longitudinal plane P2 and the first focal point 13. In fact, in an extreme condition, the focal point may exceed beyond the opening but may remain on the transverse plane P1. Such an extreme condition may result in a first part or a second part of the light-transmissive enclosure 10 that is almost parallel to the longitudinal plane P2. As shown in FIG. 5, the parabolic segment 10*e* has a higher slope compared to the parabolic limit curve 10*l*. Therefore, any light originating from the light source 30 would be reflected by the parabolic segment 10*e* in a direction not intersecting the transverse plane P1 and most likely the severe 1% upward light restriction can be realized. This design approach allows flexibility in realizing various shapes for the light-transmissive enclosure 10 that conform with the severe 1% upward light restriction.

Figure 7:
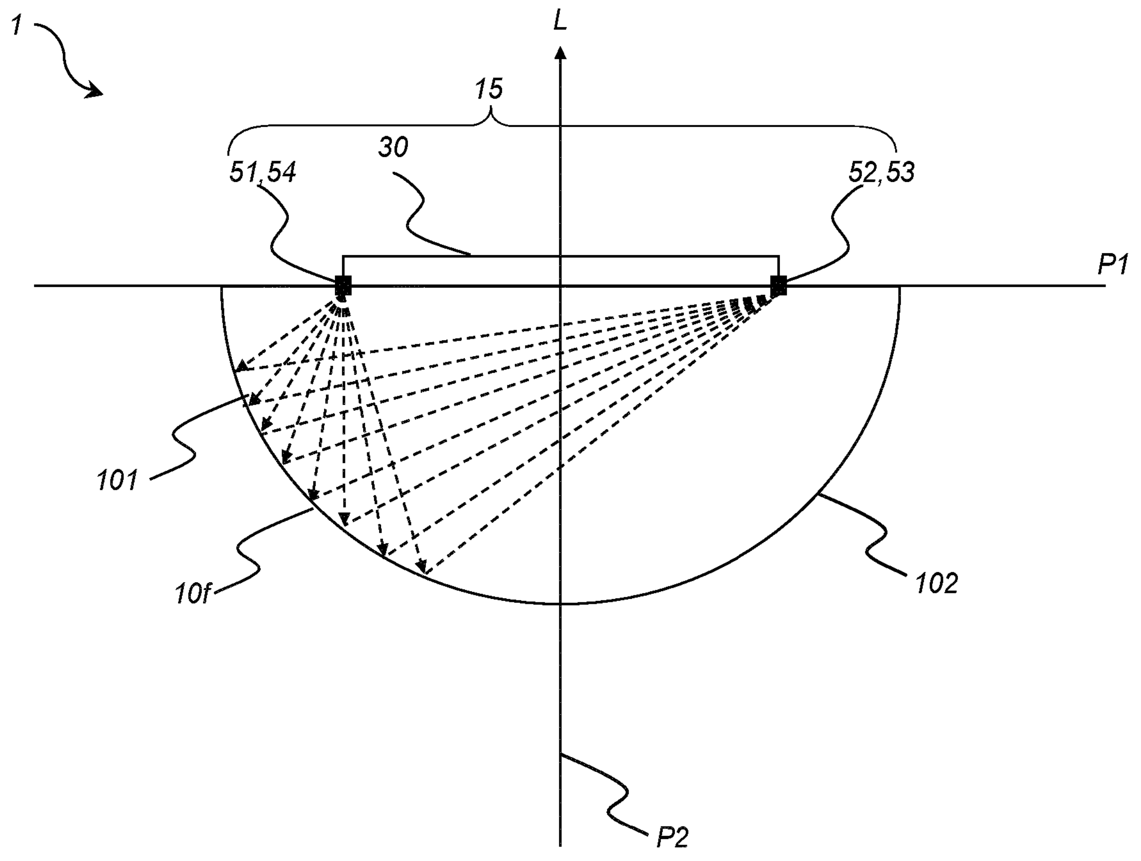
FIG. 7 shows a schematic cross-sectional view of a lighting device that comprises a light-transmissive enclosure having an elliptical shape.

FIG. 7 shows a schematic cross-sectional view of a lighting device 1 that comprises a light-transmissive enclosure 10*f* having an elliptical segment shape. The light-transmissive enclosure 10 has a first part 101 and a second part 102. The first part 101 and the second part 102 have shapes in the form of a first elliptical segment and a second elliptical segment, respectively. The first elliptical segment has a first focal point 51 and a second focal point 52. The first focal point 51 is located between the first elliptical segment and the longitudinal plane P2 and the second focal point 52 is located between the second elliptical segment and the longitudinal plane P2. The second elliptical segment has a third focal point 53 and a fourth focal point 54, the third focal point 53 is located between the second elliptical segment and the longitudinal plane P2, and the fourth focal point 54 is located between the first elliptical segment and the longitudinal plane P2. In the cross-sectional view, the first elliptical segment and the second elliptical segment together appear to be a half-segment of an ellipse. Therefore, the first focal point 51 of the first elliptical segment and the fourth focal point 54 of the second elliptical segment are the same. Similarly, the second focal point 52 of the first elliptical segment and the third focal point 53 of the second elliptical segment are the same. The major axis of the ellipse coincides with the transverse plane P1 and the minor axis of the ellipse coincides with the longitudinal plane P2 (not shown in the figure). The lighting device 1 comprises a light source 30 arranged at the transverse plane P1 such that one light-emitting end coincides with the first focal point 51 and the other light-emitting end coincides with the second focal point 52. Light originating from the first focal point 51 would reflect from the light-transmissive enclosure 10*f* and converge on the second focal point 52. As long as the light source 30 is located within the first focal point 51 and the third focal point 52, reflected light from the light-transmissive enclosure 10*f* is restricted to towards the light source 30 and eventually restricted to leave the light device 1 in a direction that does not significantly intersect the transverse plane P1. Therefore, such a shape of the light-transmissive enclosure 10*f* may also conform with the severe requirements regarding light pollution.

Figure 8:
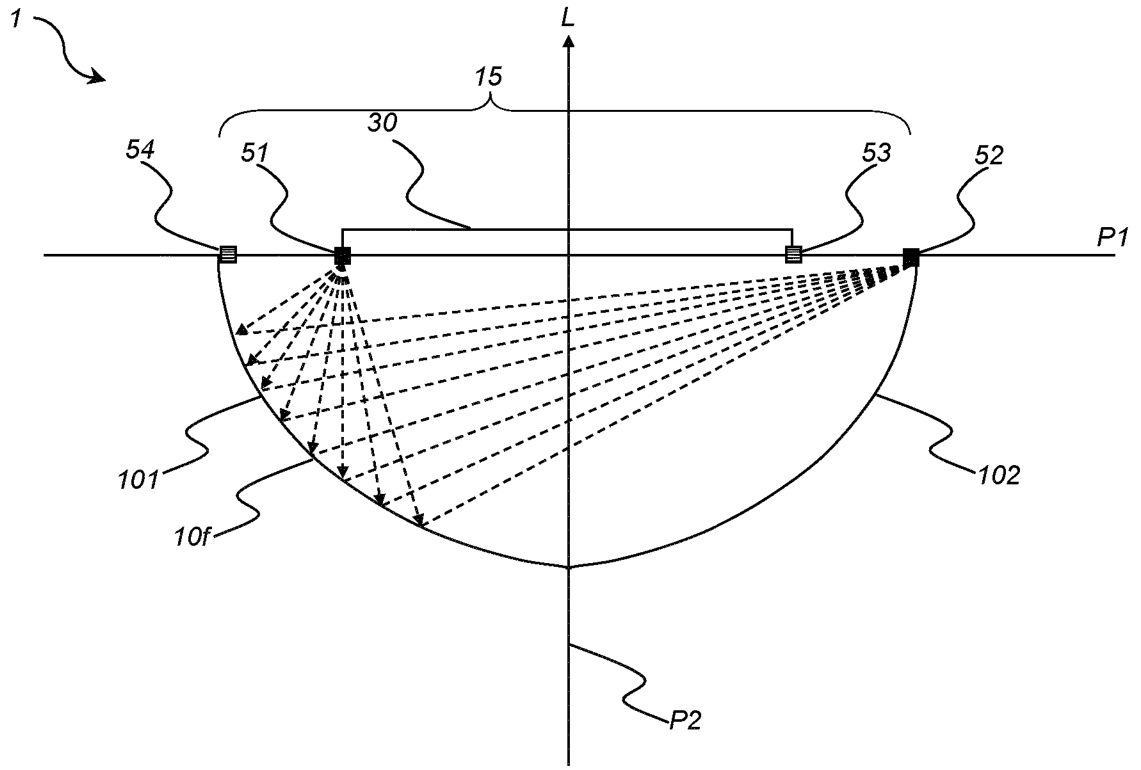
FIG. 8 shows a schematic cross-sectional view of another lighting device that comprises a light-transmissive enclosure shaped having an elliptical shape.

FIG. 8 shows a schematic cross-sectional view of another lighting device 1. In this cross-sectional view, the light-transmissive enclosure 10*f* appears to have two parts, a first part 101 and a second part 102. The first part 101 and the second part 102 have shapes in the form of a first elliptical segment and a second elliptical segment. The first elliptical segment extends from the transverse plane P1 to the longitudinal plane P2 and rotationally symmetric around the longitudinal axis L. Therefore, the major axis of the ellipse coincides with the transverse plane P1 in the opening 15, while the minor axis of the ellipse is arranged parallel to the longitudinal plane P2 (not shown in the figure). The cross-section of lighting device 1 with the light-transmissive enclosure 10*f* is shown to be mirror-symmetric with respect to the longitudinal axis L. The light source 30 is arranged between the first focal point 51 and third focal point 53. Therefore, any light originating from the first focal point 51 and the third focal point 53 and impinging on the light-transmissive enclosure 10*f* will be reflected towards the second focal point 52 and the fourth focal point 54 located at the transverse plane P1 of the lighting device 1. As long as the opening 15 is covered by a housing 40 (as shown in FIG. 2) that is light absorptive or light reflective to the reflected light, almost no light from the light device 1 would transmit in a direction that intersects the transverse plane P1. Therefore, the light-transmissive enclosure 10*f* may be shaped in an elliptical segment with the focal points of the ellipse being located on the transverse plane P1 of the light-transmissive enclosure 10*f*. In addition, the focal points have to be bounded within the opening 15 of the light-transmissive enclosure 10. This approach may result in the design of a lighting device 1 that has a smaller opening 15 compared to the design presented in FIG. 7 while conforming with the severe 1% upward light restriction for reducing light pollution.

Figure 9:
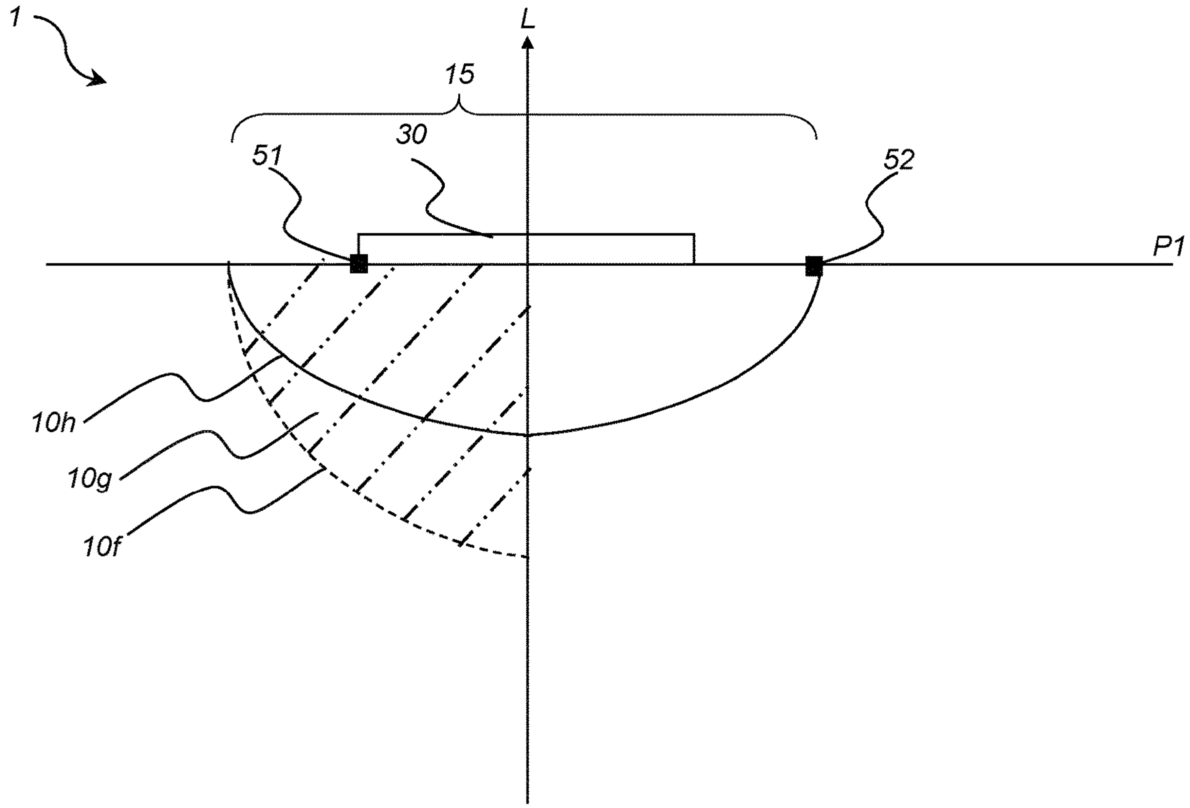
FIG. 9 shows another design method for realizing a lighting device that conforms with the severe upward light restriction for reducing light pollution.

FIG. 9 shows a design method for realizing a lighting device 1 that conforms with the severe upward light restriction for reducing light pollution. The light-transmissive enclosure 10*f* shaped in an elliptical segment has a first focal point 51 and a second ellipse focal point 52 located on the transverse plane P1. A light source 30 is located on the transverse plane P1 and symmetrically arranged with respect to the longitudinal axis L. At least one light source 30 is located on the first ellipse focal point 51. Therefore, the elliptical segment of the light-transmissive enclosure 10*f* arrangement as shown in FIGS. 7 and 8 may serve as an elliptical limit curve for facilitating design flexibility in realizing different shapes of compliant curved enclosures. The hatched area enclosed by the light-transmissive enclosure or elliptical limit curve 10*f*, the transverse plane 15, and the longitudinal plane P2 is an ellipse compliance area 10*g*. Within the ellipse compliance area 10*g*, an elliptical segment shaped light-transmissive enclosure 10*h* with a lower slope compared to the elliptical limit curve 10*f* would prevent light from transmitting in the upward direction that intersects transverse plane P1. As shown in FIG. 9, the light-transmissive enclosure 10*h* is mirror-symmetric with respect to the longitudinal axis L. The first focal point 51 and the second focal point 52 of the elliptical limit curve 10*f* is located on the transverse plane P1 and within the opening 15 of the light-transmissive enclosure 10*h*. The light-transmissive enclosure 10*h* may not have a curvature minimum located on the longitudinal axis L. Similar to FIG. 4(*a*), the light-transmissive enclosure may also have a flat enclosure surface adjoining the compliant curvature 10*h* parallel to the transverse plane P1.

Figure 10:
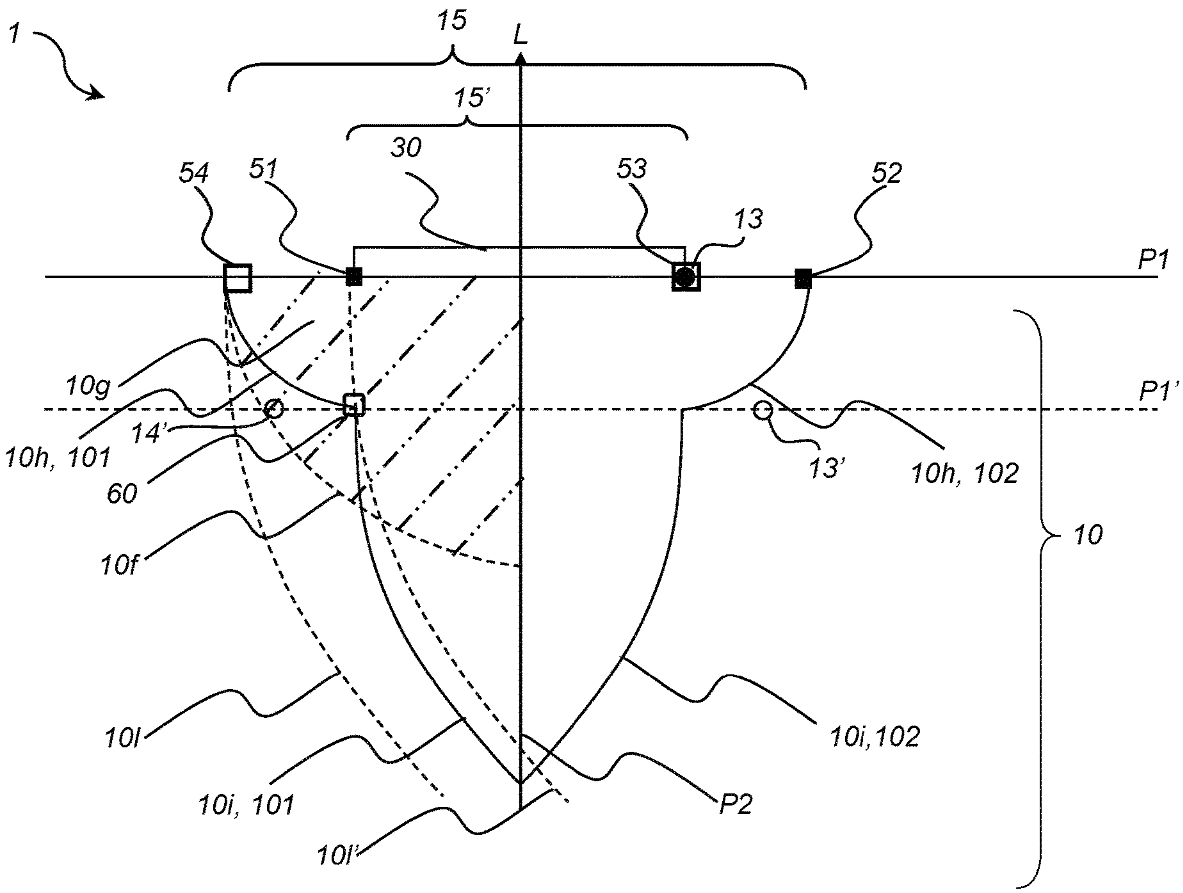
FIG. 10 shows an additional design method for realizing a lighting device that conforms with the severe upward light restriction for reducing light pollution.

FIG. 10 shows an alternative design method for realizing a lighting device 1 that conforms with the severe upward light restriction for reducing light pollution. The design method includes defining the transverse plane P1, the opening 15 of a light-transmissive enclosure 10 having two segments, and the ellipse compliance area 10*g* comprising an elliptical limit curve 10*f* that has the first ellipse focal point 51 and the second ellipse focal point 52 located within the desired opening 15. In addition, at least one light source 30 is positioned within the first ellipse focal point 51 and the second ellipse focal point 52 such that the light source 30 length is not located within the first ellipse focal point 51 and the elliptical limit curve 10*f*. The light source is symmetric with respect to the longitudinal axis L. This design approach is described by defining the first part 10*h* of the light-transmissive enclosure 10. The second part 10*h*, 102 of the light-transmissive cover 10 can be taken as a mirror symmetrical with respect to the longitudinal axis L. So the third ellipse focal point 52 and the fourth ellipse focal point 54 are also located within the opening 15 and on the transverse plane P1.

The parabolic limit curve 10*l* can be defined with its parabolic focal point 13 located on the transverse plane P1 and between longitudinal plane P2 and the second ellipse focal point 52. The light source 30 position may not exceed beyond the parabolic focal point 13 so that at least one of the light emitters from the light source 30 is located between the parabolic focal point 13 and the second ellipse focal point 52. So essentially, the length of the light source 30 is restricted by the first ellipse focal point 51 that belongs to the ellipse limit curve 10*h* and the parabolic focal point 13 that belongs to the parabolic limit curve 10*l*. The first ellipse focal point 51 is located between the first part of the light-transmissive enclosure or ellipse limit curve 10*h* and the longitudinal plane P2. The parabolic focal point 13 is located between the longitudinal plane P2 and the second ellipse focal point 52.

With these boundaries in place, a designer may first choose the first part 10*h*, 101 of the light-transmissive enclosure 10 as in first elliptical segment within the ellipse compliance area 10*g*. The designer may choose to extend it up to a point 60 that is located on a lower plane P1' that is parallel to the transverse plane P1. Then from the point 60, a new parabolic limit curve 10*l'* can be defined that is parallel to the initially defined parabolic limit curve 10*l*. From the point 60, the first parabolic segment 10*i* of the light-transmissive enclosure 10 can be defined to be a parabolic segment that has a higher slope compared to the new parabolic limit curve 10*l'*. In other words, the first parabolic segment 10*i*, 101 is chosen so that the corresponding first parabola focal point 13' is located on the lower plane P1' and the light source 30 is still configured not the exceed beyond the first parabola focal point 13'. The second parabolic segment 10*i*, 102, and the corresponding second parabola focal point 14' is also located on the lower plane P1'. And the light source 30 is located between the first parabola focal point 13' and the second parabola focal point 14'.

The first part 101 of the light-transmissive enclosure 10, therefore, comprises a first segment 10*h* shaped in an elliptical segment and the second segment 10*i* shaped in a parabolic segment and the point 60 being the interconnect between the two segments. The second part 102 of the light-transmissive enclosure 10 can be considered to be rotationally symmetric around the longitudinal axis L. The opening 15 or the first segment opening 15 defined by the first part 101 and the second part 102 of the first segment 10*h* is larger compared to the partial opening or the second segment opening 15' defined by the first part 101 and the second part 102 of the second segment 10*i*. And the partial opening is located in the lower plane P1'.

By combining two different segments having different geometric shapes and relying on the limit curves, one may enjoy much more flexibility in realizing various shapes for the light-transmissive enclosure 10 that conform with the severe 1% upward light restriction.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting device comprising a light-transmissive enclosure and a light source, wherein the light-transmissive enclosure has an outer surface and an inner surface opposite to the outer surface, the inner surface at least in part forming a cavity, wherein the light-transmissive enclosure has an opening lying in a transverse plane (P1), wherein the light source is arranged on the transverse plane (P1), or on a side of the transverse plane (P1) opposite of the light-transmissive enclosure, and configured to emit light into the cavity, wherein the light-transmissive enclosure is arranged around a longitudinal axis (L), the longitudinal axis (L) lying in a longitudinal plane (P2) that is perpendicular to the transverse plane (P1), wherein the light-transmissive enclosure has a first part and a second part separated from each other by the longitudinal plane (P2), wherein the first part is shaped as a first parabolic segment having a first focal point that is located on the transverse plane (P1) and between the second part and the longitudinal plane (P2), wherein the second part is shaped as a second parabolic segment having a second focal point that is located on the transverse plane (P1) and between the first part and the longitudinal plane (P2), wherein the light source is arranged between the first focal point and the second focal point, and wherein at least one of the outer surface and the inner surface of the light-transmissive enclosure has shapes in the form of a parabolic segment rotated around the longitudinal axis (L).

2. The lighting device according to claim 1, wherein the at least one of the outer surface and the inner surface of the light-transmissive enclosure with shapes in the form of the parabolic segment is a mirror-symmetrical segment of a segment of a plane curve rotated 180° around the longitudinal axis (L).

3. The lighting device according to claim 1, wherein the wherein the at least one of the outer surface and the inner surface of the light-transmissive enclosure in the form of the parabolic segment has a constant thickness.

4. A lighting device comprising a light-transmissive enclosure and a light source, wherein the light-transmissive enclosure has an outer surface and an inner surface opposite to the outer surface, the inner surface at least in part forming a cavity, wherein the light-transmissive enclosure has an opening lying in a transverse plane (P1), wherein the light source is arranged on the transverse plane (P1), or on a side of the transverse plane (P1) opposite of the light-transmissive enclosure, and configured to emit light into the cavity, wherein the light-transmissive enclosure is arranged around a longitudinal axis (L), the longitudinal axis (L) lying in a longitudinal plane (P2) that is perpendicular to the transverse plane (P1), wherein the light-transmissive enclosure has a first part and a second part separated from each other by the longitudinal plane (P2), wherein the first part and the second part have shapes in the form of a first elliptical segment and a second elliptical segment, respectively, wherein the first elliptical segment has a first focal point and a second focal point, the first focal point being located between the first elliptical segment and the longitudinal plane (P2) and the second focal point being located between the second elliptical segment and the longitudinal plane (P2), wherein the second elliptical segment has a third focal point and a fourth focal point, the third focal point being located between the second elliptical segment and the longitudinal plane (P2), and the fourth focal point being located between the first elliptical segment and the longitudinal plane (P2), wherein each of the first focal point, the second focal point, the third focal point, and the fourth focal point is located on the transverse plane (P1) and within the opening, and wherein the light source is arranged between the first focal point and the third focal point.

5. The lighting device according to claim 4, wherein at least one of the outer surface and the inner surface of the light-transmissive enclosure has shapes in the form of an elliptical segment.

6. The lighting device according to claim 4, wherein the light-transmissive enclosure has a constant thickness.

7. The lighting device according to claim 4, the lighting device comprises a housing that is light absorptive or a light reflective and located on the transverse plane (P1), or on a side of the transverse plane (P1) opposite of the light-transmissive enclosure, and the housing is configured to cover the opening.

8. The lighting device according to claim 4, the light-transmissive enclosure may further comprise an anti-reflection coating arranged on the inner surface.

9. A lighting device comprising a light-transmissive enclosure and a light source, wherein the light-transmissive enclosure has an outer surface and an inner surface opposite to the outer surface, the inner surface at least in part forming a cavity, wherein the light source is arranged on a transverse plane (P1), or on a side of the transverse plane (P1) opposite of the light-transmissive enclosure, and configured to emit light into the cavity, wherein the light-transmissive enclosure is arranged around a longitudinal axis (L), the longitudinal axis (L) lying in a longitudinal plane (P2) that is perpendicular to the transverse plane (P1), wherein the light-transmissive enclosure has a first part and a second part separated from each other by the longitudinal plane (P2), wherein at least one of the first part and the second part has a first segment and a second segment, the first segment being located in between the transverse plane (P1) and the second segment, and the second segment being connected with the first segment at a point located on a lower plane (P1') that is parallel to the transverse plane (P1), wherein the light-transmissive enclosure has a first segment opening lying in a transverse plane (P1), the first segment opening being defined by the first part and the second part of the first segment, wherein the first part and the second part of the first segment have shapes in the form of a first elliptical segment and a second elliptical segment, respectively, wherein the first elliptical segment has a first ellipse focal point and a second ellipse focal point, the first ellipse focal point being located between the first elliptical segment and the longitudinal plane (P2) and the second ellipse focal point being located between the second elliptical segment and the longitudinal plane (P2), wherein the second elliptical segment has a third ellipse focal point and a fourth ellipse focal point, the third focal point being located between the second elliptical segment and the longitudinal plane (P2), and the fourth ellipse focal point being located between the first elliptical segment and the longitudinal plane (P2), wherein each of the first ellipse focal point, the second ellipse focal point, the third ellipse focal point, and the fourth ellipse focal point is located on the transverse plane (P1) and within the opening, wherein the light source is arranged between the first ellipse focal point and the third ellipse focal point, wherein the light-transmissive enclosure has a second segment opening lying in a lower plane (P1), the second segment opening being defined by the first part and the second part of the second segment, wherein the first part of the second segment is shaped as a first parabolic segment having a first parabola focal point that is located on the lower plane (P1'), wherein the second part of the second segment is shaped as a second parabolic segment having a second parabola focal point that is located on the lower plane (P1'), and wherein the light source is arranged between the first parabola focal point and the second parabola focal point.

* * * * *